UNITED STATES PATENT OFFICE.

JOHANNES SCHILLING, OF HALENSEE, NEAR BERLIN, GERMANY, ASSIGNOR TO SIEMENS & HALSKE, AKTIENGESELLSCHAFT, OF BERLIN, GERMANY, A CORPORATION OF GERMANY.

METHOD OF PRODUCING TANTALUM.

958,180.  Specification of Letters Patent.  Patented May 17, 1910.

No Drawing.  Application filed October 15, 1906. Serial No. 339,016.

*To all whom it may concern:*

Be it known that I, JOHANNES SCHILLING, a subject of the Emperor of Germany, and a resident of Halensee, near Berlin, Germany, have invented a new and useful Method of Producing Tantalum, of which the following is a specification.

The present invention has for its object a method of producing tantalum which excels the methods of producing tantalum which are already known, in simplicity, cheapness and high yield. As the raw material from which tantalum is produced, tantalic acid is preferably employed, but other oxids or also the oxychlorid or analogous double compound may also be used. The employment of tantalic acid as the raw material is of especial advantage because the tantalic acid, even if it is impure, occurs in nature and does not change in quality and is the cheapest raw material. But it was formerly customary to start with the double fluorid which had to be obtained from the tantalic acid in a very troublesome manner with the help of complicated and expensive means.

The reduction of the tantalic acid or of the other oxygen compounds takes place according to the present improved method directly by means of hydrogen. Hitherto it has been generally supposed that the oxygen compounds of tantalum are not reduced by hydrogen. Probably the reason of the former failure of the attempts to reduce the oxygen compounds of tantalum by means of hydrogen was that too low temperatures were worked with. The reduction of the oxygen compounds only takes place at about white heat. At least the reduction at low temperatures is so slight that it does not come into consideration in practice and may be easily overlooked.

The method is preferably carried out by, for example, heating a metal crucible filled with the oxygen compound to be reduced in an electric arc furnace while a stream of hydrogen is supplied over it. The water which is formed during the reduction is at once conducted away with the stream of hydrogen. The metal crucible may, for example, consist of nickel; by making the walls of the crucible sufficiently thick the reduced metal is not contaminated by nickel. In case of need the crucible may be coated with tantalum or may be entirely made of tantalum. If this method is employed the crucible is preferably connected to the one electrode, and the opposite electrode preferably consists of tantalum. Instead of the heating being effected by means of the electric arc, it may also be caused by conducting an electric current through the crucible or through the sheet of metal serving as a support for the material to be reduced, said current sufficing to heat up the sheet-metal to the temperature required to reduce it.

The metal which is formed by the reduction is obtained in the form of a homogeneous molten body when the temperature is high enough. If low temperatures are used in working, only an amorphous powder or a more or less porous sintered body is obtained. Homogeneous molten bodies are, as a rule, obtained when the electric arc is employed in the process.

The metal obtained in the above mentioned method forming the subject matter of the present invention, is in the first place very brittle and contains much hydrogen; it may be that the metal has chemically combined with the hydrogen, or it may be that it has occluded it, or that it has formed a kind of alloy with it. This hydrogenous raw product already suffices for many purposes for which it is employed. In order to obtain ductile metal free from hydrogen from it, it is necessary to subject this hydrogenous product to another purifying process. Purification is preferably effected by keeping the metal in a molten condition during a long time and by continuously drawing off the separated hydrogen by an air pump until the metal possesses the required degree of purity.

If the method of reduction is carried out by means of the electric arc, this process of purification may be effected, in direct connection with the process of reduction, by stopping the supply of hydrogen after the reduction of the oxygen compound has taken place and by connecting the receptacle in which the reduction took place to an air-pump. Particularly in this last mentioned mode of operation, the method is a very simple one, as the pure ductile metal is obtained directly from the tantalic acid in one single series of operations. The method according to the present invention is, therefore, of special value, because the material from which the pure metallic tantalum is obtained is only acted upon by one gas, and this may be employed in suitable excess without the fear of detrimentally affecting the final product, and, moreover, the material from which the tantalum is obtained is completely reduced, and again, no by-products form which must be first removed in a troublesome manner, as is necessary, for example, in reducing the double fluorid of tantalum with sodium, as was usual hitherto.

What I claim as my invention and desire to secure by Letters Patent is:

1. The herein described method of producing metallic tantalum, which comprises converting an oxygen compound of tantalum into a hydrogenous tantalum and subsequently rendering and keeping the hydrogenous tantalum molten and drawing off the hydrogen which is evolved.

2. The herein described method of producing metallic tantalum, which comprises replacing by hydrogen the oxygen of an oxygen compound of tantalum, and subsequently fusing the hydrogenous tantalum and drawing off the hydrogen thereby evolved.

3. The herein described method of producing metallic tantalum from oxygen compounds of tantalum, which comprises enveloping an oxygen compound of tantalum in an atmosphere of hydrogen, heating said compound to a high temperature in said atmosphere and thereby reducing said compound and melting the reduced product and exhausting the space around said product while in its molten condition and thereby freeing said product from gas.

4. The herein described method of producing metallic tantalum from oxygen compounds of tantalum, which comprises enveloping tantalic acid in an atmosphere of hydrogen, heating said acid to a high temperature in said atmosphere and thereby reducing said compound and melting the reduced product and exhausting the space around said product while in its molten condition and thereby freeing said product from gas.

5. The herein described method of producing metallic tantalum from oxygen compounds of tantalum, which comprises enveloping tantalic acid in an atmosphere of hydrogen, heating said acid to a high temperature in an electric furnace and thereby reducing said acid and melting the reduced product and exhausting the space around said product while in its molten condition and thereby freeing said product from gas.

6. The herein described method of producing metallic tantalum from oxygen compounds of tantalum, which comprises enveloping an oxygen compound of tantalum in an atmosphere of hydrogen, heating said compound to a high temperature and thereby reducing said compound and melting the reduced product, exhausting the space around said product and at the same time applying heat to said product and thereby maintaining said product in molten condition and freeing the same from gas.

7. The herein described method of producing metallic tantalum from oxygen compounds of tantalum, which comprises enveloping tantalic acid in an atmosphere of hydrogen, heating said acid to a high temperature and thereby reducing the acid and melting the reduced product, exhausting the space around said product and at the same time applying heat to said product and thereby maintaining said product in molten condition and freeing the same from gas.

In testimony whereof I have signed my name to this specification in the presence of the two subscribing witnesses.

JOHANNES SCHILLING.

Witnesses:
WOLDEMAR HAUPT,
HENRY HASPER.